(12) United States Patent
Mayor et al.

(10) Patent No.: US 11,563,646 B2
(45) Date of Patent: Jan. 24, 2023

(54) MACHINE LEARNING-BASED NETWORK ANALYTICS, TROUBLESHOOT, AND SELF-HEALING SYSTEM AND METHOD

(71) Applicant: Beegol Corporation, Sao Paulo (BR)

(72) Inventors: Gilberto Mayor, Sao Paulo (BR); Ícaro C. Dourado, Sao Paulo (BR)

(73) Assignee: Beegol Corporation, Sao Paulo (BR)

( * ) Notice: Subject to any disclaimer, the term of this patent is extended or adjusted under 35 U.S.C. 154(b) by 0 days.

(21) Appl. No.: 17/739,338

(22) Filed: May 9, 2022

(65) Prior Publication Data

US 2022/0272001 A1     Aug. 25, 2022

Related U.S. Application Data

(62) Division of application No. 16/944,682, filed on Jul. 31, 2020, now Pat. No. 11,356,335.

(51) Int. Cl.
| | |
|---|---|
| *H04L 41/16* | (2022.01) |
| *H04L 41/12* | (2022.01) |
| *H04L 43/0805* | (2022.01) |
| *G06N 20/00* | (2019.01) |
| *H04W 84/12* | (2009.01) |
| *H04L 43/0852* | (2022.01) |
| *H04L 101/622* | (2022.01) |

(52) U.S. Cl.
CPC .............. *H04L 41/16* (2013.01); *G06N 20/00* (2019.01); *H04L 41/12* (2013.01); *H04L 43/0805* (2013.01); *H04L 43/0852* (2013.01); *H04W 84/12* (2013.01); *H04L 2101/622* (2022.05)

(58) Field of Classification Search
CPC .... H04L 41/145; H04L 41/5009; H04L 43/03
See application file for complete search history.

*Primary Examiner* — William G Trost, IV
*Assistant Examiner* — Christopher P Cadorna
(74) *Attorney, Agent, or Firm* — Invent Capture, LLC.; Samuel S. Cho

(57) ABSTRACT

A novel machine learning-based network analytics, troubleshoot, and self-healing system identifies and locates sources of data network problems autonomously within an entire end-to-end network topology of a network operator, while not necessitating human diagnosis of the data network problems. This system uniquely embeds a smart universal telemetry (SUT) as a quality-of-experience (QoE) parameter collection agent in intermediary transport-level network equipment and each end-user modem, which in turn enables on-demand collection of robust diagnostic data from all end-user modems and intermediary transport level nodes in a data network. By executing a machine learning (ML)-based artificial intelligence (AI) analytical module in a cloud-computing resource, the system then achieves autonomous identification and source pinpointing of network problems, and even self-repairs some machine-identified data network problems autonomously through remote software updates performed intelligently by the ML-based AI analytical module, if physical replacement of a network equipment is unnecessary to resolve such problems.

11 Claims, 9 Drawing Sheets

An Overall Process Flow Diagram for a Machine Learning-Based Network Analytics, Troubleshoot, and Self-Healing System An Overall Process Flow Diagram for a Machine Learning-Based Network Analytics, Troubleshoot, and Self-Healing System

100

Main Components of the Machine Learning-Based Network Analytics, Troubleshoot, and Self-Healing System

200

An Example of Modem-Embedded and/or Other Device-Embedded SUTs in Various Nodes of a Data Network in the Machine Learning-Based Network Analytics, Troubleshoot, and Self-Healing System

300

An Example of End User Modem-Embedded Collection Agents and Network Transport-Level Collection Agents as SUTs Integrated in Various Network Nodes in the Machine Learning-Based Network Analytics, Troubleshoot, and Self-Healing System An Example of Network Transport-Level Problem Identification by the AI Analytical Module in the Machine Learning-Based Network Analytics, Troubleshoot, and Self-Healing System

500

An Autonomous Diagnostic Process Flow with an AI Refinement Feedback Loop in the Machine Learning-Based Network Analytics, Troubleshoot, and Self-Healing System

600

An Example of a QoE Analysis for a One-Day Measurement Window Performed by the Machine Learning-Based Network Analytics, Troubleshoot, and Self-Healing System

700

$$\text{QoE} = \sum_{i=1}^{3} W_i Z_i \text{ where } W_i = \frac{1}{3} \text{ and } Z_i \text{ is given by } \begin{cases} \cdot \ 1: \text{KPI Score} \\ \cdot \ 2: \text{Severity Score} \\ \cdot \ 3: \text{Frequency Score} \end{cases}$$

Problem Score — 801

An Example of a QoE Analysis for a Three-Day Measurement Window Performed by the Machine Learning-Based Network Analytics, Troubleshoot, and Self-Healing System

An Example of QoE Improvement Priority Rules Determined from One-day and Three-day Measurement Window QoE Problem Alerts

MACHINE LEARNING-BASED NETWORK ANALYTICS, TROUBLESHOOT, AND SELF-HEALING SYSTEM AND METHOD

BACKGROUND OF THE INVENTION

The present invention generally relates to one or more electronic systems for data network problem identifications and repairs. More specifically, various embodiments of the present invention relate to autonomous machine-determined network analytics, troubleshoot, and self-healing systems that utilize artificial intelligence with a machine learning feedback loop for continuous refinements and improvements to network problem identifications and autonomous repair processes. Furthermore, various embodiments of the present invention also relate to methods of operating such autonomous machine-determined network analytics, troubleshoot, and self-healing systems.

Today's Internet service providers (ISPs) and telecommunication operators confront a daunting task of resolving persistent cases of various data network service interruptions, congestions, and equipment failures in their vast data networks and service areas. Data network service interruptions, spotty connections, unintended throughput reductions, and sudden equipment failures adversely impact a subscriber's "quality of experience" (QoE), which is an end user-oriented metric of the quality of communication experience through a particular data network. Because low QoE satisfaction rates are positively correlated to customer churn and defection rates, many ISPs and telecommunication operators typically allocate a large team of support personnel dedicated to network problem troubleshooting and a correspondingly-large operating budget for such human-staffed troubleshoot tasks.

Unfortunately, conventional computerized network problem diagnostic solutions utilized by ISPs and telecommunication operators require significant human staff interventions in trial-and-error manualized troubleshooting processes, because conventional network diagnostic tools are typically only capable of detecting a limited number of problems at intermediary broadband nodes and major network access points. For example, conventional broadband diagnostic methods utilize static and regular time-interval for data collection and are limited to using remote protocols such as TR-069 and TR183, which restrict data collection to each protocol's specifications. The types of network health data specified by TR-069 and TR183 protocol standards, which may be transmitted to a network operator at regular time intervals, are insufficient to provide a complete real-time topology of the health of various network nodes, let alone the health of individual on-premise customer network equipment.

In the current state of the art in resolving customer complaints for alleged network problems, it is customary to use trial-and-error and process-by-elimination methods by a human repair staff, who is tasked with probing various network nodes and customer on-premise equipment in a manualized and time-consuming process until a culprit is identified. In many instances, this manualized and time-consuming process for identifying and resolving network problems and customer QoE complaints involves misplaced or repeated visits by a repairman to alleged sources of network problems.

Such inefficient and manualized data network troubleshooting procedures inherently cause a significant time lag between a customer's initial complaint and a satisfactory resolution to the alleged network problem, which in turn impacts the overall QoE metric more negatively. This also implies that under the current state of the art for network troubleshooting, any short-staffed network operators for repair personnel are likely to score low on QoE measures. Furthermore, the manualized data network troubleshooting procedures in the current state of the art necessitate high costs of human staffing and labor, due to the time-consuming and inefficient nature of human-driven trial-and-error and process-by-elimination methods employed by the field staff.

Therefore, it may be desirable to devise a novel electronic system for identifying and locating sources or causes of data network problems autonomously within an entire end-to-end network topology of a network operator, while not necessitating human diagnosis of the data network problems.

Furthermore, it may also be desirable to devise a novel electronic system that autonomously heals data network-related problems within an entire end-to-end network topology of a network operator, whenever situations merit software-based automated network repairs.

In addition, it may also be desirable to devise a method for operating a novel electronic system for identifying, locating, and self-healing sources or causes of data network problems autonomously within an entire end-to-end network topology of a network operator, while not necessitating human diagnosis of the data network problems.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a machine learning-based network analytics, troubleshoot, and self-healing system is disclosed. This system comprises: (1) a modem-embedded smart universal telemetry (SUT) (collection agent) module incorporated in an end-user modem and operates with a modem device firmware, wherein the modem-embedded SUT module is configured to accumulate and then transmit end-user quality-of-experience (QoE) diagnostic parameters as dynamic inputs to a wireless local-area network (LAN) and broadband big data module via an operator's wide-area data network; (2) a broadband measurement server connected to the end-user modem and the operator's wide-area data network, wherein the broadband measurement server actively measures network performance criteria from the modem-embedded SUT module to another node in the operator's wide-area data network to identify a network congestion, an outright network disconnection, or another network bottleneck issue autonomously without a human operator intervention, and wherein the broadband measurement server is further configured to transmit broadband diagnostic datasets accumulated from active measurements of the network performance criteria to the wireless LAN and broadband big data module; (3) a wireless LAN measurement server connected to the end-user modem and the operator's wide-area data network, wherein the wireless LAN measurement server actively collects wireless LAN-related diagnostic datasets from one or more wireless LAN networks connected to the operator's wide-area data network, and wherein the wireless LAN measurement server is further configured to transmit the wireless LAN-related diagnostic datasets to the wireless LAN and broadband big data module; (4) the wireless LAN and broadband big data module connected to the modem-embedded SUT module, the broadband measurement server, and the wireless LAN measurement server, wherein the wireless LAN and broadband big data module receives the broadband diagnostic datasets from the broadband measurement server, the wireless LAN-related diagnostic datasets from the wireless LAN measurement server, and the end-user QoE diagnostic parameters from the modem-embedded SUT module, and wherein the wireless LAN and broadband big data module is further configured to convert, categorize, and store all collected diagnostic information in a dynamic relational database in a cloud-computing resource connected to the operator's wide-area data network; and (5) a machine learning (ML)-based artificial intelligence (AI) analytical module connected to the wireless LAN and broadband big data module and the operator's wide-area data network, wherein the ML-based AI analytical module operates artificial intelligence (AI) and adaptive machine learning on the broadband diagnostic datasets, the wireless LAN-related diagnostic datasets, and the end-user QoE diagnostic parameters retrieved from the dynamic relational database in the wireless LAN and broadband big data module to diagnose, determine, and resolve a network QoE problem autonomously without the human operator intervention, and wherein a resolution to the network QoE problem involves either an autonomous machine-determined trouble-ticket generation with the network QoE problem pinpointed and location identified, or an autonomous machine-initiated self-healing of the network QoE problem via a software modification to a network equipment causing the network QoE problem.

In another embodiment of the invention, a method for operating a machine learning-based network analytics, troubleshoot, and self-healing system is disclosed. This method comprises the steps of: (1) colleting end-user quality-of-experience (QoE) parameters, broadband diagnostic datasets, and wireless local-area network (LAN)-related diagnostic datasets from a modem-embedded SUT (collection agent) module in an end-user modem, a broadband measurement server, and a wireless LAN measurement server, which are connected to an operator's wide-area data network; (2) converting the end-user QoE parameters, broadband diagnostic datasets, and wireless LAN-related diagnostic datasets into an input features format compatible to a machine learning (ML)-based artificial intelligence (AI) analytical module; (3) synthesizing the input features format further to include a customer profile, a simplified network topology for the operator's wide-area data network, and additional information associated with network equipment in the operator's wide-area data network; (4) feeding the input features format into the machine learning (ML)-based artificial intelligence (AI) analytical module executed in a cloud-computing resource connected to the operator's wide-area data network; (5) identifying and locating a network QoE problem from the machine learning (ML)-based artificial intelligence (AI) analytical module; (6) developing a fingerprint from the machine learning (ML)-based artificial intelligence (AI) analytical module to comprehend traits, origins, and characteristics autonomously for the network QoE problem; and (7) generating and displaying a resolution strategy autonomously from the machine learning (ML)-based artificial intelligence (AI) analytical module to resolve the network QoE problem within the operator's wide-area data network.

BRIEF DESCRIPTION OF DRAWINGS

FIG. 8 shows an example of a QoE analysis for a three-day measurement window performed by the machine learning-based network analytics, troubleshoot, and self-healing system, in accordance with an embodiment of the invention.

DETAILED DESCRIPTION

Figure 1:
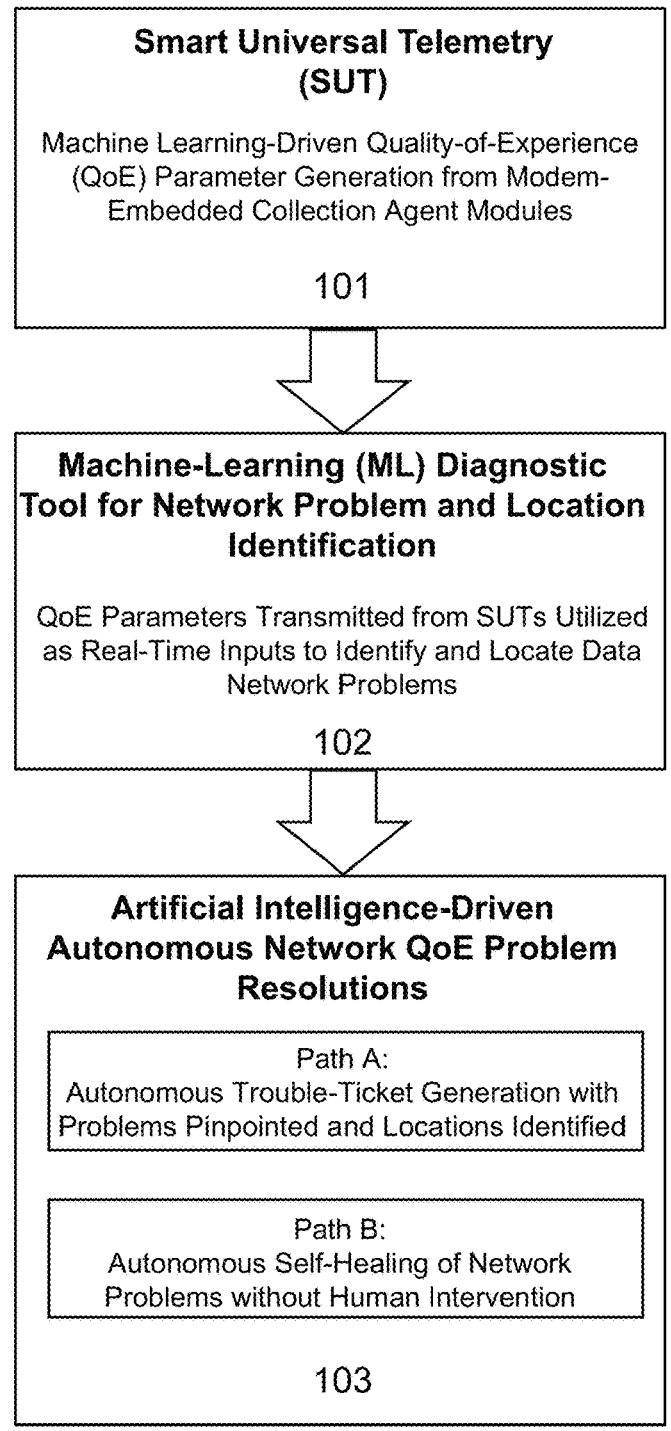
FIG. 1 shows an overall process flow diagram for a machine learning-based network analytics, troubleshoot, and self-healing system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel machine learning-based network analytics, troubleshoot, and self-healing systems and methods of operating thereof. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term herein referred to as "autonomous," or "autonomously" is defined as machine-initiated and machine-determined without resorting to or relying on a human operator's manual decisions.

Furthermore, for the purpose of describing the invention, a term herein referred to as "quality of experience," or "QoE," is defined as a measure of a data network subscriber's satisfaction with a data network service by an Internet service provider or a telecommunications operator. The data network subscriber in context of QoE measurements is typically an "end-user" customer with one or more electronic devices connected to the Internet, a local area network (LAN), a broadband network, and/or other data networks. In general, QoE is positively correlated to uninterrupted and speedy data network operations and negatively correlated to frequent network disruptions, sluggish network speeds, sudden network equipment failures, and slow repair processes, because a typical end-user customer values a reliable and speedy network service and dislikes network downtimes, congestions, and equipment breakdowns.

In addition, a term herein referred to as a "smart universal telemetry," or an "SUT," is defined as a QoE parameter collection agent module embedded in an end-user modem or in another network equipment within various transport nodes of a data network. Typically, the QoE parameter collection agent module is configured to gather and transmit subscriber modem-originating diagnostic data parameters to a network operator's machine-learning diagnostic tool on an on-demand or periodic basis for network QoE problem discoveries and location identifications, which are autonomously performed by the machine-learning-based network analytics, troubleshoot, and self-healing system. In a preferred embodiment of the invention, the SUT is an embedded QoE parameter collection software integrated into a modem communications chipset that also stores the modem's firmware. In another embodiment of the invention, the SUT may be a combination of a sensor device and an embedded QoE parameter collection software integrated into a modem.

Moreover, for the purpose of describing the invention, a term herein referred to as "computer server" is defined as a physical computer system, another hardware device, a software module executed in an electronic device, or a combination thereof. Furthermore, in one embodiment of the invention, a computer server is physically or wirelessly connected to one or more data networks, such as a local area network (LAN), a wide area network (WAN), a cellular network, and the Internet. Moreover, a group of computer servers may be flexibly scaled up or down to constitute a cloud computing network to process large volumes of network and device diagnostics data and to execute a machine learning-based network analytics, troubleshoot, and self-healing system for automated QoE improvements.

One aspect of an embodiment of the present invention is providing a novel electronic system for identifying and locating sources or causes of data network problems autonomously within an entire end-to-end network topology of a network operator, while not necessitating human diagnosis of the data network problems.

Another aspect of an embodiment of the present invention is providing a novel electronic system that autonomously heals data network-related problems within an entire end-to-end network topology of a network operator, whenever situations merit software-based automated network repairs.

Yet another aspect of an embodiment of the present invention is providing a novel electronic system that autonomously generates trouble tickets for physical repairs without human diagnostic interventions, wherein each trouble ticket pinpoints problems and identifies problem locations autonomously by utilizing a machine-learning diagnostic tool that monitors an entire end-to-end network topology of a network operator, including individual end-user modems.

Yet another aspect of an embodiment of the present invention is providing a method for operating a novel electronic system for identifying, locating, and self-healing sources or causes of data network problems autonomously within an entire end-to-end network topology of a network operator, while not necessitating human diagnosis of the data network problems.

FIG. 1 shows an overall process flow diagram (100) for a novel machine learning-based network analytics, troubleshoot, and self-healing system, in accordance with an embodiment of the invention. In a preferred embodiment of the invention, a smart universal telemetry (SUT), which is particularly designed for the machine learning-based network analytics, troubleshoot, and self-healing system as a "collection agent," is incorporated into each end-user modem as an embedded software loaded onto a modem's circuit board. Typically, the SUT is machine-coded into a modem's communications chipset that also integrates its device firmware. In some instances, the SUT may instead be stored in a flash memory or a hard drive within the modem's casing, and dynamically loaded into a CPU/APU and a memory unit of the modem as modem diagnostic data collections are invoked by the machine learning-based network analytics, troubleshoot, and self-healing system.

As shown in the first step (101) of the overall process flow diagram (100) for the machine learning-based network analytics, troubleshoot, and self-healing system, the SUT functions as an end-user modem diagnostic dataset collection agent, and is configured to generate and transmit quality-of-experience (QoE) parameters to a machine-learning diagnostic tool operating from a cloud computing resource for network QoE problem and location identification. Examples of QoE parameters include, but are not limited to, network latency, jitter, download speed, upload speed, packet loss, quality of signal, users/device statistics, site survey, and hardware malfunction indicators. By directly embedding an SUT into each end-user modem, the machine learning-based network analytics, troubleshoot, and self-healing system is able to monitor and diagnose all nodes, splitters, and terminals of a data network in real time under its autonomous machine supervision, which in turn enables the system to rapidly identify, locate, and resolve network QoE complaints (e.g. network downtime, sluggishness, etc.) by customers.

Furthermore, the modem-embedded smart universal telemetry (SUT) is easily scalable to millions of modems and can be flexibly utilized through the machine-learning diagnostic tool executed in a cloud-computing resource (e.g. one or more cloud network-connected scalable servers), which is also configured to improve accuracy and effectiveness of its autonomous QoE problem detection and location identification capabilities through an artificial intelligence (AI) refinement feedback loop provided by the big-data machine learning over an extended operational period. In the preferred embodiment of the invention, SUT-embedded modems are deployed in one or more combinations of cable modem networks, fiber optic networks, and digital subscriber line (e.g. DSL, VDSL) network environments. Moreover, a modem-embedded software that constitutes the SUT may be flexibly and dynamically updated over the air by the machine learning-based network analytics, troubleshoot, and self-healing system to refine or edit diagnostic data collection capabilities from each targeted end-user modem.

As shown in the second step (102) of the overall process flow diagram (100) for the machine learning-based network analytics, troubleshoot, and self-healing system, the ML diagnostic tool for network QoE problem and location identification is able to collect and analyze numerous network diagnostic parameters in the entire end-to-end topology of a data network it supervises, including all end-user modems and all intermediary transport nodes and related network equipment (e.g. routers, network servers, splitters, switches, etc.). By incorporating SUTs in all end-user modems and all intermediary transport nodes of the data network, the ML diagnostic tool for network QoE problem and location identification is able to capture and diagnose a complete end-to-end operating and functional snapshot of the data network in real time, which in turn enables rapid and autonomous QoE problem and location identifications even without a human operator intervention in many instances, as shown in the second step (102) of the overall process flow diagram (100).

In the preferred embodiment of the invention, the machine-learning (ML) diagnostic tool is a software module executed in a cloud-computing resource (e.g. one or more cloud network-connected scalable servers). The ML diagnostic module is also configured to improve accuracy and effectiveness of its autonomous QoE problem detection and location identification capabilities through an artificial intelligence (AI) refinement feedback loop provided by the big-data machine learning over an extended operational period, wherein the big data is an accumulation of various QoE parameters originating from end-user modems and intermediary transport-level network nodes. Furthermore, in the preferred embodiment of the invention, the ML diagnostic tool operating from the cloud-computing resource to monitor and identify QoE problems can coexist with legacy systems and conventional diagnostic tools within the data network, thus simplifying operational management of the data network by an ISP or another telecommunications service provider.

Once the ML diagnostic tool autonomously discovers QoE problems and pinpoints the source of such QoE problems originating from an equipment failure within an intermediary transport node, a splitter, an end-user modem, a data line disconnection, a power outage in a certain region, etc., the machine learning-based network analytics, troubleshoot, and self-healing system utilizes artificial intelligence to follow one of the two pathways autonomously (i.e. without human operator interventions) to resolve QoE problems, as shown in the third step (103) in the overall process flow diagram (100).

The first path (i.e. "Path A") involves an autonomous trouble-ticket generation with problems pinpointed and locations identified by the machine learning-based network analytics, troubleshoot, and self-healing system without human operator interventions. Once a trouble ticket is generated, a human repair technician can use the autonomous machine-identified QoE problem descriptions, problem source location information, and recommended repair actions to perform an onsite repair, a customer premise visit for an equipment replacement or repair, or another action to resolve the QoE problems as rapidly and efficiently as possible. For the machine learning-based network analytics, troubleshoot, and self-healing system, this first path (i.e. "Path A") may be an optimal solution for resolving network QoE problems that require physical repairs or replacement of parts, equipment, and/or connections, instead of software-based online repair actions.

On the other hand, as also shown in the third step (103) in the overall process flow diagram (100) in FIG. 1, the second path (i.e. "Path B") involves an autonomous self-healing of network QoE problems without human repair technician interventions. The autonomous self-healing approaches for QoE problem resolutions are particularly ideal if a network congestion or a disconnection can be resolved by taking a software-based online repair action to a machine-identified source of the QoE problem. Examples of such software-based online repair actions include, but are not limited to, changing a wireless LAN channel in an end-user modem, rebooting a network equipment, and/or reinstalling a piece of software in a device identified as the source of the network QoE problem.

Compared to conventional human-intensive and manual trial-and-error diagnostic processes, either pathways (i.e. "Path A," or "Path B") from the artificial intelligence-driven autonomous network QoE problem resolutions executed by the machine learning-based network analytics, troubleshoot, and self-healing system are significantly faster, cheaper, and more accurate in resolving customer QoE complaints for alleged network congestions, downtimes, or equipment failures. Therefore, the machine learning-based network analytics, troubleshoot, and self-healing system, as disclosed in various embodiments of the present invention, enables more efficient and accurate resolutions to customer QoE complaints, which in turn improves customer satisfaction and retention rates. Furthermore, the autonomous nature of the machine learning-based network analytics, troubleshoot, and self-healing system reduces wasted time, efforts, and manpower to resolve network QoE problems, thus contributing to a network provider's operational cost savings and efficiencies.

Figure 2:
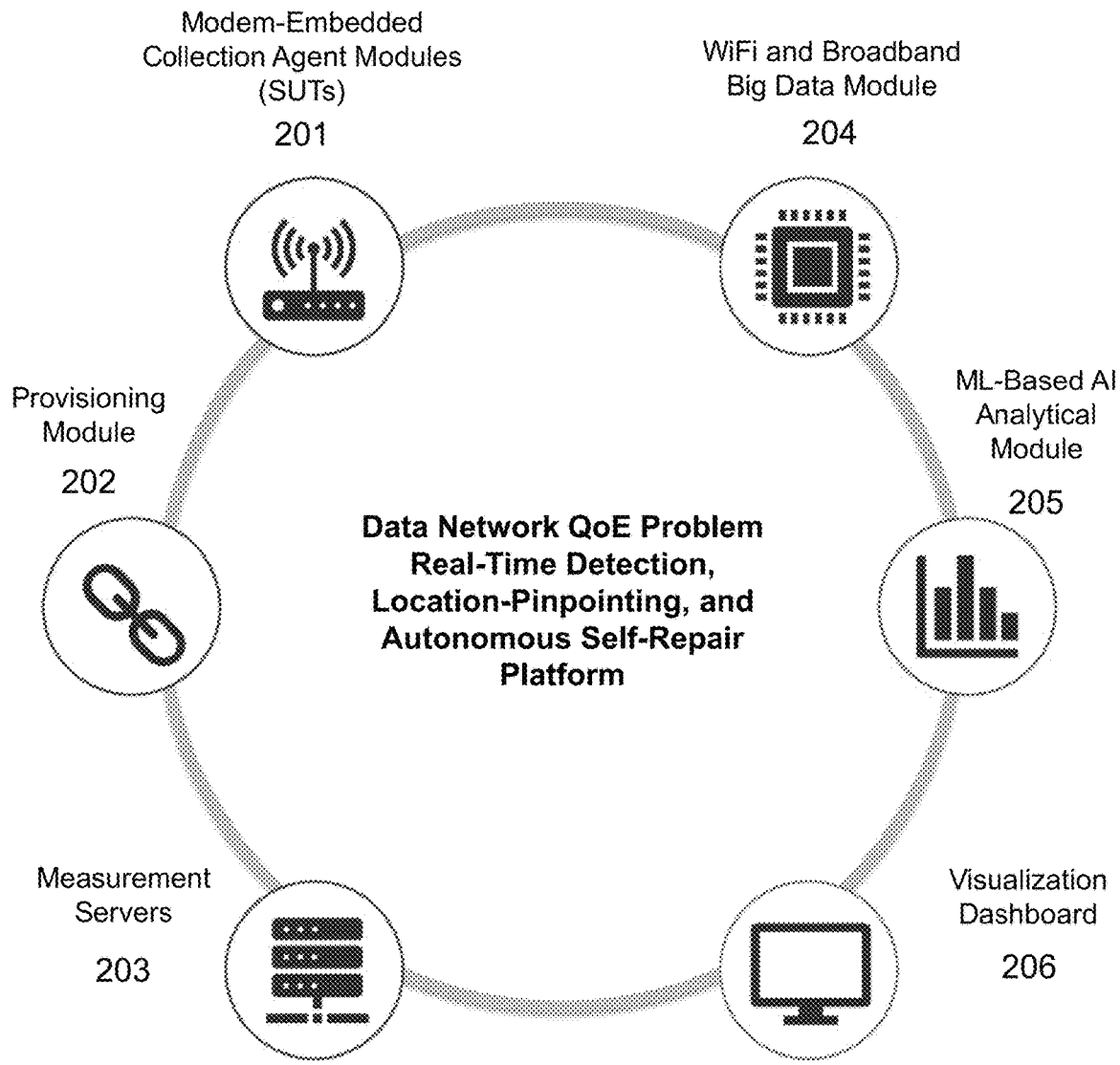
FIG. 2 shows main components of the machine learning-based network analytics, troubleshoot, and self-healing system, in accordance with an embodiment of the invention.

FIG. 2 shows main components (200) of the machine learning-based network analytics, troubleshoot, and self-healing system, in accordance with an embodiment of the invention. The machine learning-based network analytics, troubleshoot, and self-healing system comprises a modem-embedded collection agent module (i.e. also called interchangeably herein as a "smart universal telemetry" (SUT)) (201), a provisioning module (202), a measurement server (203), a wireless LAN and broadband big-data module (204), a machine learning (ML)-based artificial intelligence analytical module (205), and a visualization dashboard interface (206), as illustrated in FIG. 2. When operatively connected together, these main components (201, 202, 203, 204, 205, 206) of the machine learning-based network analytics, troubleshoot, and self-healing system constitute a data network quality-of-experience (QoE) problem detection, location-pinpointing, and autonomous self-repair platform, as shown in FIG. 2.

In a preferred embodiment of the invention, each of the modem-embedded collection agent module (201) incorporates several logical sub-blocks, such as a wireless LAN (i.e. WiFi) data collector, a broadband data collector, a collection transfer agent unit, and a communication broker unit. On the one hand, the wireless LAN data collector in the modem-embedded collection agent module (201) is responsible for gathering all wireless LAN-related diagnostics parameters within the modem, such as the quality of WiFi signals, users and device statistics, and wireless access point site surveys. On the other hand, the broadband data collector in the modem-embedded collection agent module (201) is configured to accumulate passive diagnostics data related to the broadband network, while also actively measuring performance characteristics against servers in the data network. The broadband data collector may passively capture, actively measure, and accumulate real-time broadband network characteristics, such as network latency, jitter, download speed, upload speed, and packet loss.

In addition, in the preferred embodiment of the invention, the modem-embedded collection agent module (201) may also collect other diagnostic parameters, such as modem's internal performance data (e.g. executed modem instructions, memory usage, number of resets/reboots) and time-series data (e.g. Domain Name System (DNS) queries, session data, transport control protocol (TCP) data) to provide a comprehensive real-time and on-demand diagnostic snapshot to the machine learning-based artificial intelligence analytical module (205) in the machine learning-based network analytics, troubleshoot, and self-healing system. The modem-embedded collection agent module (201) is designed to be incorporated into each of all end-user modems that are connected to the data network operated by a network service provider. In the preferred embodiment of the invention, the modem-embedded collection agent module (201) is incorporated into an end-user modem, and operates with a modem device firmware as part of a modem-embedded software suite.

In some cases, the modem-embedded collection agent module (201) is machine-coded directly into an embedded system chip for hardware-based operation. In other cases, the modem-embedded collection agent module (201) resides in a non-volatile data storage, such as a Flash memory unit or a hard disk, and is executed by a modem application processor unit (APU) or another logical execution unit as needed. Importantly, the modem-embedded collection agent module (201) is configured to accumulate and subsequently transmit end-user QoE diagnostic parameters as dynamic inputs to a wireless LAN and broadband big data module through the operator's wide-area data network. Examples of the end-user QoE diagnostic parameters include, but are not limited to, modem device operation information, modem device process information, modem memory content information, domain name system (DNS) information, and modem device-specific time-series parameters.

Continuing with the embodiment of the invention as illustrated in FIG. 2, the collection transfer agent unit incorporated in the modem-embedded collection agent module (201) is configured to transmit the accumulated network diagnostics datasets from the wireless LAN data collector and the broadband data collector, whenever the machine learning (ML)-based artificial intelligence (AI) analytical module (205) executed in a cloud-computing resource demands transfer of collected datasets from a particular modem connected to the network. The frequency of collected data transfer may be purely on-demand, periodic, or a combination of the two, depending on a specific implementation of the machine learning-based network analytics, troubleshoot, and self-healing system. Furthermore, the communication broker unit inside the modem-embedded collection agent module (201) provides a mediated data exchange among multiple data collection sub-blocks inside the modem and the ML-based AI analytical module (205).

Moreover, the provisioning module (202) is another main component of the machine learning-based network analytics, troubleshoot, and self-healing system, and is responsible for initialization, registration, and housekeeping of numerous modem-embedded collection agent modules for up-to-date linking with the rest of the system components. In the preferred embodiment of the invention, the provisioning module (202) includes an initialization agent that accommodates an automated exchange of preparatory parameters between a collection agent (i.e. SUT) in a modem and a cloud-computing server operating the ML-based AI analytical module (205), when the modem undergoes a startup or reset sequence. The initialization agent in the provisioning module (202) typically sets the frequency of data collection and the initial types of diagnostic data that will be transmitted to the ML-based AI analytical module (205), when the modem comes online in the data network. The provisioning module (202) may also include a monitored device registration agent that keeps track of currently-active and inactive SUTs in end-user modems and other network equipment.

Furthermore, the measurement servers (203) are parts of the main components of the machine learning-based network analytics, troubleshoot, and self-healing system, and is responsible for measuring key quality-of-service (QoS) indicators by utilizing several designated servers to evaluate end-to-end user experience. In the preferred embodiment of the invention, the measurement servers (203) include a broadband measurement sever that actively measures network performance criteria from one point (e.g. a collection agent in the modem) to another point (e.g. the broadband measurement server), and generates broadband diagnostic datasets. Examples of such broadband diagnostic datasets include, but are not limited to, latency, jitter, download speed, upload speed, and packet loss information between one node (e.g. the collection agent module in the end-user modem) and another node (e.g. the broadband measurement server) in the operator's wide-area data network. Typically, numerous broadband measurement servers are distributed along the data network to identify network bottlenecks. A network bottleneck may be identified between "Point A" and "Point B," when a broadband measurement server measuring the network performance criteria between these two points determines an unacceptable level of network congestion or an outright disconnection.

In addition, the measurement servers (203) in the machine learning-based network analytics, troubleshoot, and self-healing system may also include a wireless LAN (e.g. "WiFi") measurement sever configured to collect diagnostic data from one or more wireless local area networks. In a typical network diagnostic configuration for the machine learning-based network analytics, troubleshoot, and self-healing system, end-user modems connected to the wireless local area networks as well as the broadband networks transmit the WiFi-related diagnostic datasets to the wireless LAN measurement server, which is a type of the measurement servers (203), as shown in FIG. 2. Examples of WiFi or wireless LAN-related diagnostic datasets include quality of signal, site survey, user statistics, and device statistics information associated with one or more wireless LAN networks connected to the operator's wide-area data network.

Subsequently, as also shown in FIG. 2, the WiFi-related diagnostic datasets as well as broadband diagnostic datasets from the measurement servers (203) are packaged, categorized, and stored in the wireless LAN and broadband big data module (204). In the preferred embodiment of the invention, the wireless LAN and broadband big data module (204) is part of a dynamic relational database executed in a scalable number of servers in the cloud-computing resource of the machine learning-based network analytics, troubleshoot, and self-healing system.

Furthermore, the machine learning (ML)-based artificial intelligence analytical module (205) is the kernel of the machine learning-based network analytics, troubleshoot, and self-healing system that operates artificial intelligence and adaptive machine learning to diagnose, determine, and resolve network quality of experience (QoE) problems that typically involve network slowdowns, disconnections, or equipment failures experienced by the network's end-user customers. In the preferred embodiment of the invention, the machine learning (ML)-based artificial intelligence analytical module (205) comprises a network diagnostic data reading sub-block (e.g. 601, 602, 603 in FIG. 6), a network diagnostic analysis tool sub-block (e.g. 604 in FIG. 6), a network heuristic rules validation sub-block (e.g. 605 in FIG. 6), and a QoE problem resolution sub-block (e.g. 604 in FIG. 6).

The network diagnostic data reading sub-block (e.g. 601, 602, 603 in FIG. 6) is capable of extracting data features from the collected diagnostic datasets. Typically, collected QoE parameters from SUTs are transformed or converted to AI-compatible formats as input features to the network diagnostic analysis tool sub-block. The network diagnostic data reading sub-block may also package and prepare a customer profile, a simplified network topology dataset, a converted/transformed QoE parameters from SUTs, and any other pertinent data related to network equipment. Then, the AI-compatible converted and extracted input features processed by the network diagnostic data reading sub-block are fed into the network diagnostic analysis tool sub-block (e.g. 604 in FIG. 6), which conducts artificial intelligence machine determination of potential causes and locations of network congestions, disruptions, equipment failures, or other problems impacting end users' satisfaction with the operating quality of the data network.

During the AI machine determination of such intelligent and autonomous diagnostics process, the network diagnostic analysis tool sub-block may request more diagnostic data from a suspected source of network problems. For example, the network diagnostic analysis tool sub-block, using its first-pass AI reasoning in isolating one or more potential sources of network problems, may inquire a particular network router, a particular network switch, a particular end-user modem, or a particular intermediary server of AI's analytical interest to receive additional diagnostics data to conduct a more detailed second-pass AI analysis to confirm the source and the location of a particular network problem, and to develop a finalized autonomous recommendation (i.e. without a direct instruction or intervention from a human system operator) for resolving the identified network QoE problem.

Furthermore, the network heuristic rules validation sub-block (e.g. 605 in FIG. 6) in the machine learning (ML)-based artificial intelligence analytical module (205) conducts a basic "sanity check" against network heuristic rules pertinent to the identified network QoE problem. For instance, the network heuristic rules validation sub-block may determine an order of network repair priority for resolving multiple network QoE problems by performing sanity checks against network heuristic rules, as illustrated in a situational example (900) in FIG. 9. In another instance, the network heuristics rules validation sub-block may determine that the basic sanity check of the network heuristic rules associated with the identified network QoE problem suggests that the problem is either already resolved or falsely flagged by SUTs or other components of the system.

Moreover, the QoE problem resolution sub-block (e.g. 604 in FIG. 6) in the machine learning (ML)-based artificial intelligence analytical module (205) is configured to execute the finalized autonomous recommendation by following one of the two pathways: (1) generating a trouble ticket with the QoE problem(s) identified, described, and located to assist a physical repair by a human repairman, or (2) software-based self-healing of the identified QoE problem(s) without human repairman's intervention.

In the preferred embodiment of the invention, the machine learning (ML)-based artificial intelligence analytical module (205) is executed on a scalable number of cloud-networked computer servers, and carries out both the second step (102) and the third step (103) in the overall process flow diagram (100), which was previously described in conjunction with FIG. 1. The machine learning (ML)-based artificial intelligence analytical module (205) is able to collect and analyze numerous network diagnostic parameters in the entire end-to-end topology of a data network it supervises, including all end-user modems (e.g. SUTs represented by element 201) and all intermediary transport nodes and related network equipment (e.g. routers, network servers, splitters, switches, etc. encompassed by elements 202, 203, 204, and 206).

By incorporating SUTs in all end-user modems and all intermediary transport nodes of the data network, the ML-based AI analytical module (205) is able to capture and diagnose a complete end-to-end operating and functional snapshot of the data network in real time, which in turn enables rapid and autonomous identification and location-pinpointing of potential network problems (e.g. network quality-of-experience (QoE) problems), even without a human operator intervention in many instances.

In the preferred embodiment of the invention, the ML-based AI analytical module (205) is a software module executed in a cloud-computing resource (e.g. one or more cloud network-connected scalable servers). The ML-based AI analytical module (205) is also configured to improve accuracy and effectiveness of its autonomous QoE problem detection and location identification capabilities through an artificial intelligence (AI) refinement feedback loop provided by the big-data machine learning over an extended operational period, wherein the big data dynamically updated by the wireless LAN and broadband big data module (204) is an accumulation of various QoE parameters originating from end-user modems and intermediary transport-level network nodes and splitters. Furthermore, in the preferred embodiment of the invention, the ML-based AI analytical module (205) operating from the cloud-computing resource to monitor and identify QoE problems can coexist with legacy systems and conventional diagnostic tools within the data network, thus simplifying operational management of the data network by an ISP or another telecommunications service provider.

Moreover, the main components (200) of the machine learning-based network analytics, troubleshoot, and self-healing system as shown in FIG. 2 also includes the visualization dashboard interface (206), which is a system user interface executed in a computer server to display various collected time-series diagnostic data parameters, converted/transformed input features, analytical processing indicators, and analytical outcomes. Examples of analytical outcomes visualized on a display panel connected to the machine learning-based network analytics, troubleshoot, and self-healing system include, but are not limited to, likely nature and location of potential network problems identified autonomously by the ML-based AI analytical module (205), contents of autonomous machine-generated trouble tickets, and autonomous self-healing procedure information in an attempt to resolve the identified network problems automatically without human repairman interventions.

Figure 3:
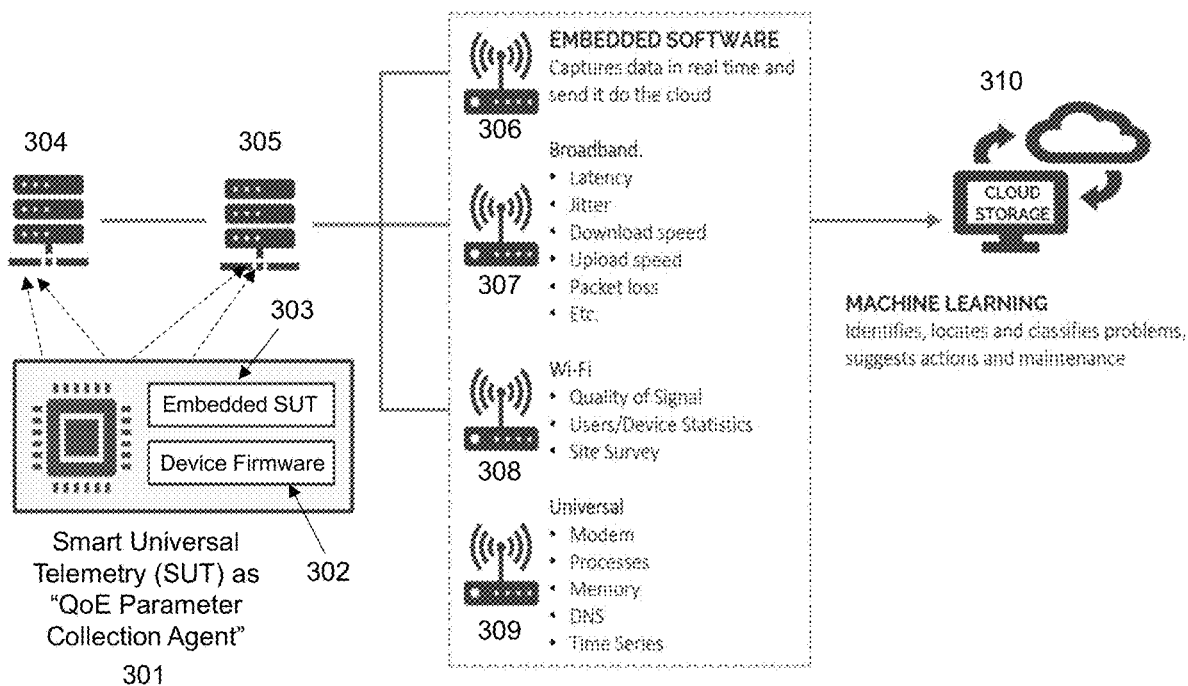
FIG. 3 shows an example of modem-embedded and/or other device-embedded smart universal telemetries (SUTs) in various nodes of a data network in the machine learning-based network analytics, troubleshoot, and self-healing system, in accordance with an embodiment of the invention.

FIG. 3 shows an example (300) of modem-embedded and/or other device-embedded smart universal telemetries (SUTs) in various nodes of a data network in the machine learning-based network analytics, troubleshoot, and self-healing system, in accordance with an embodiment of the invention. In this example (300) as shown in FIG. 3, an embedded SUT (303) is integrated into an end-user modem (304 or 305), and is configured to be executed on top of or in association with a modem device firmware (302), which is responsible for general operation of the end-user modem (304 or 305). The embedded SUT (303) functions as a quality-of-experience (QoE) parameter collection agent (301) for the end-user modem, which is operatively connected to one or more routers, splitters, switches, nodes, and other intermediary network equipment within a data network.

As illustrated by the example (300) in FIG. 3, in some embodiments of the invention, SUTs can also optionally be incorporated into such intermediary network equipment, such as a broadband router (307), a WiFi router (308), a network splitter, a network switch, or other intermediary network equipment (306, 309). In the preferred embodiment of the invention, each SUT is an embedded software configured to capture and transmit diagnostic data in real time to other components (e.g. 202, 203, 204, 205, or 206 in FIG. 2) of the machine learning-based network analytics, troubleshoot, and self-healing system. The SUT in the broadband router (307) is configured to collect both passive and active data. Examples of collected passive data are transmission (TX), reception (RX), packet information, and modem counters. Moreover, for the active data collection, the SUT in the broadband router (307) is configured to generate active measurements for estimating download and upload throughput, latency, packet loss, and jitter against any measurement servers (e.g. 203 in FIG. 2) and at any time and frequency.

For example, the latency measurement from Point A to Point B can be conducted by the SUT in the broadband router (307) with one or more measurement servers in the network. The SUT can also determine whether a set of IPv6 users are blocked by a server (e.g. due to a blacklist), and generate active data collection based on dynamic or conditional events (e.g. if latency increases, check nearby neighbors' broadband throughput performance). Typically, the broadband router (307) captures latency, jitter, download speed, upload speed, DNS, and packet loss as diagnostic datasets, and transmits such datasets to a "big data" module (e.g. 204 in FIG. 2) and an ML-based AI analytical module (e.g. 205 in FIG. 2) operating on a cloud-computing resource and storage (310) connected to the data network, as shown in FIG. 3.

Furthermore, the WiFi router (308) captures quality of signal information, channel information, users/device statistics, and site survey information, and transmits such datasets to the "big data" module and the ML-based AI analytical module operating on the cloud-computing resource and storage (310), as shown in FIG. 3. In the preferred embodiment of the invention, network routers (307, 308) and other intermediary network equipment (306, 309) may also capture device health/functionality information, device process (e.g. current or historical) information, device memory content information, time-series information (e.g. DNS, Hashed MAC inside a modem for privacy, etc.), and collection mode information (e.g. broadcast, multicast, unicast, real-time collection, interval-based collection, etc.), which are subsequently transmitted to the "big data" module and the ML-based AI analytical module operating on the cloud-computing resource and storage (310).

Figure 4:
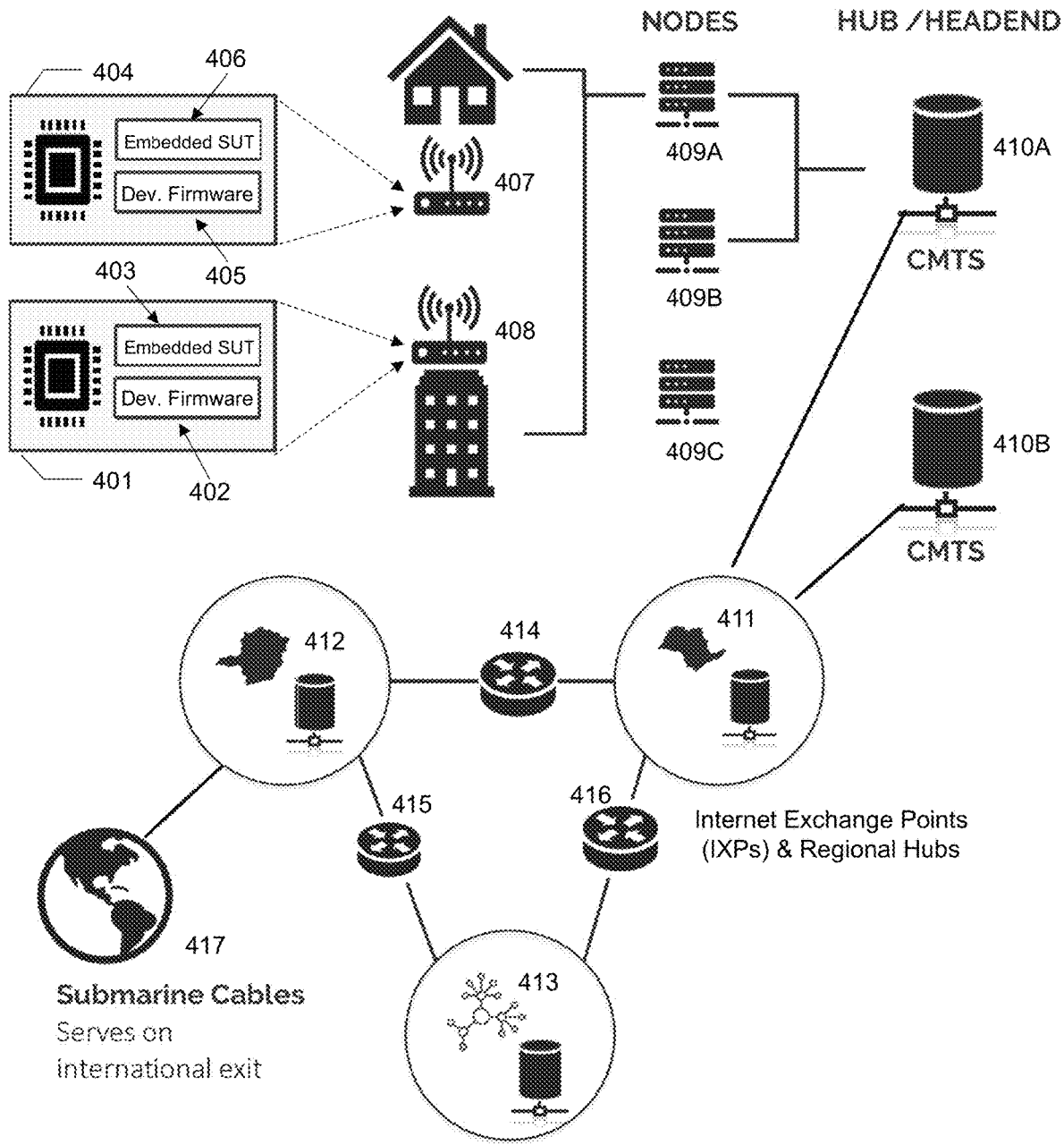
FIG. 4 shows an example of end user modem-embedded collection agents and network transport-level collection agents as smart universal telemetries (SUTs) integrated in various network nodes in the machine learning-based network analytics, troubleshoot, and self-healing system, in accordance with an embodiment of the invention.

FIG. 4 shows an example (400) of end user modem-embedded collection agents and network transport-level collection agents as smart universal telemetries (SUTs) (403, 406) integrated in various network nodes in the machine learning-based network analytics, troubleshoot, and self-healing system, in accordance with an embodiment of the invention. As shown in this example (400), an SUT (403 or 406) can be a QoE parameter collection agent module (401 or 404) embedded in an end-user modem (407, 408), or a transport-level collection agent module in another network equipment (409A~409C, 410A, 410B, 411, 412, 413, 414, 415, 416, 417) within various transport nodes of a data network.

Typically, the QoE parameter collection agent module (401 or 404) is configured to gather and transmit subscriber modem-originating diagnostic data parameters to a network operator's machine-learning diagnostic tool on an on-demand or periodic basis for network QoE problem discoveries and location identifications, which are autonomously performed by the machine-learning-based network analytics, troubleshoot, and self-healing system. In the preferred embodiment of the invention as shown in FIG. 4, the SUT (403 or 406) can be an embedded QoE parameter collection software integrated into a modem communications chipset that also stores the modem's firmware (402, 405). In another embodiment of the invention, the SUT may be a combination of a sensor device and an embedded QoE parameter collection software integrated into a modem.

In the example (400) as shown in FIG. 4, an embedded SUT may also be integrated into various network transport-level intermediary equipment, such as routers, splitters, switches, nodes, and other intermediary network equipment, within a data network. Depending on a particular implementation of the machine learning-based network analytics, troubleshoot, and self-healing system, SUT-embedding into transport-level intermediary equipment can occur at last-mile or intermediary nodes (409A, 409B, 409C), cable modem termination system (CMTS) at a network hub or headend (410A, 410B), various Internet exchange points (IXPs) (414, 415, 416), regional hubs (411, 412, 413), and in routers or repeaters associated with submarine cables (417) for international hubs.

Figure 5:
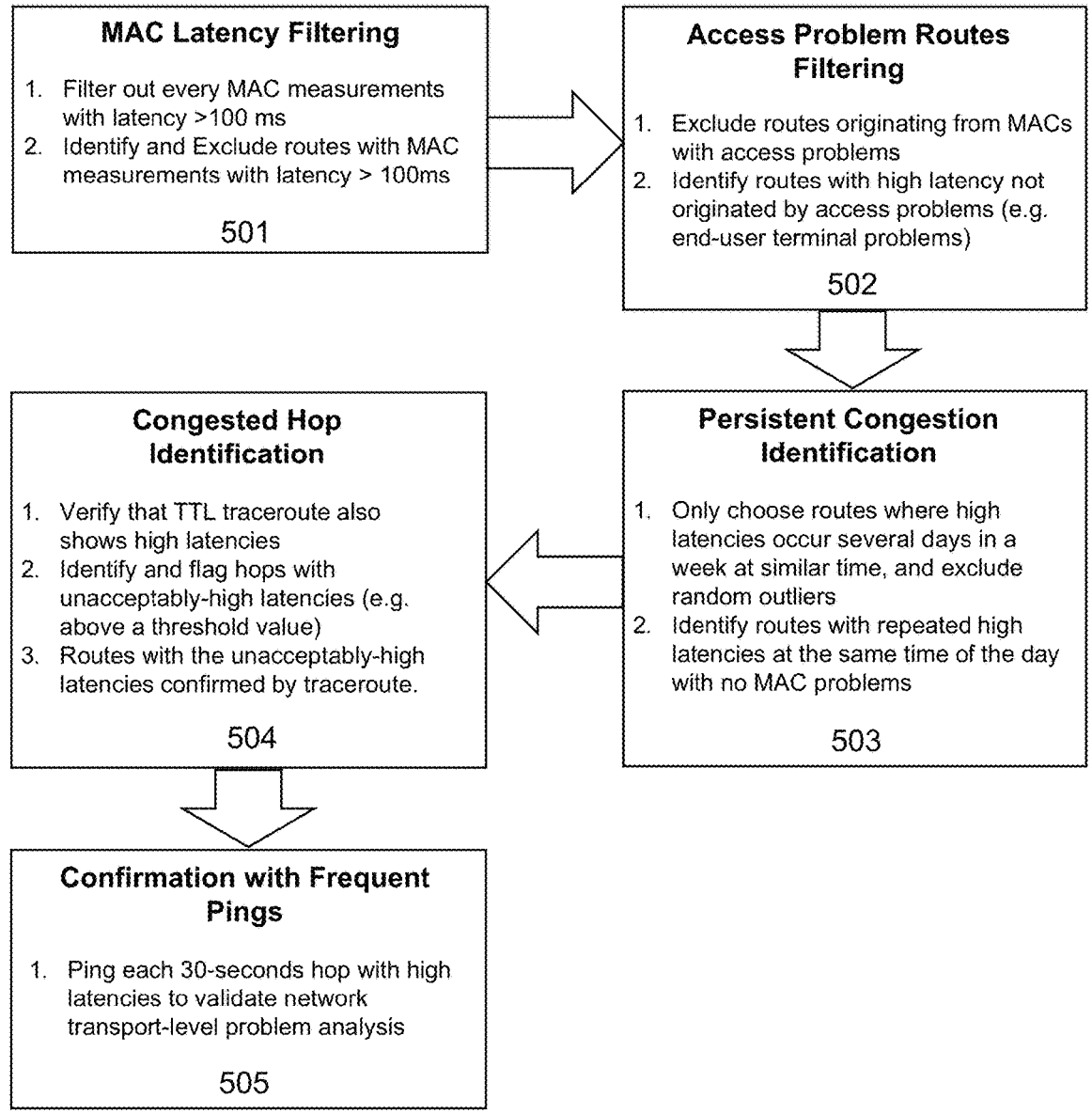
FIG. 5 shows an example of network transport-level problem identification by the artificial intelligence (AI) analytical module in the machine learning-based network analytics, troubleshoot, and self-healing system, in accordance with an embodiment of the invention.

FIG. 5 shows an example (500) of network transport-level problem identification by the artificial intelligence (AI) analytical module in the machine learning-based network analytics, troubleshoot, and self-healing system, in accordance with an embodiment of the invention. A "network transport-level problem" in context of various embodiments of the invention refers to an intermediary network connection failure or congestion, which is caused by an intermediary network equipment (e.g. a network router, a network splitter, a network server, a network switch, an electrical or optical cable, etc.) in a data network, as opposed to an end-user modem or an end-user device. In the preferred embodiment of the invention, an SUT in this situation may be embedded into an intermediary network equipment as a transport-level collection agent module to enable on-demand network diagnostic checkups and throughput performance measurements, when the machine learning-based network analytics, troubleshoot, and self-healing system invokes the diagnosis from its AI analytical module.

As shown in the example (500) in FIG. 5, a first step (501) in the network transport-level problem identification is media access control (MAC) layer latency filtering. Typically, an excessive MAC latency suggests that something is wrong with an end-user device, an end-user modem, or another end-user hardware. Therefore, in a process to identify intermediary unit problems within a data network, it may be desirable to filter out every MAC measurements with latency greater than a certain threshold value (e.g. 100 milliseconds), and also identify and exclude routes with MAC measurements with latency greater than that threshold value in the system's intelligent and autonomous investigation of network transport-level problem identification process, as shown in the first step (501).

Subsequently, the AI analytical module in the machine learning-based network analytics, troubleshoot, and self-healing system performs a second step (502) to further process the intelligent and autonomous investigation of network transport-level problem identification. The second step (502) further filters out access problem routes, which involves excluding routes originating from MACs with access problems and identifying routes with high latency not originated by access problems (e.g. end-user device or terminal problems). The AI analytical module then identifies persistent intermediary network congestion problems as a third step (503) in the intelligent and autonomous investigation of network transport-level problem identification. The third step (503) involves the AI analytical module selectively and intelligently choosing to only investigate routes where high latencies occur repeatedly over a pre-defined period (e.g. over a few days, a week, etc.), while excluding random outliers with sporadic and transient latencies. For example, the AI analytical module is able to identify "problematic" intermediary routes with repeated high latencies at the same time of the day with no MAC problems.

Then, the AI analytical module performs a congested hop identification process as a fourth step (504) of the intelligent and autonomous investigation of the network transport-level problem determination, as shown in FIG. 5. This fourth step (504) involves verifying that time-to-live (TTL) traceroutes also show high latencies on the identified problematic routes, and then identifying and flagging hops with unacceptably-high latencies, wherein the term "unacceptably-high" latencies may be defined as latencies above an acceptable threshold value. By the end of the fourth step (504), the AI analytical module is able to independently validate previously-identified routes with the unacceptably-high latencies. Lastly, the AI analytical module further confirms the identified network transport-level problems with frequent pings as a fifth step (505) of the autonomous machine analysis, as shown in FIG. 5. In one example, this confirmation procedure involves pinging each of the identified problematic high-latency routes with a 30-second hop to validate the network transport-level problem analysis.

Figure 6:
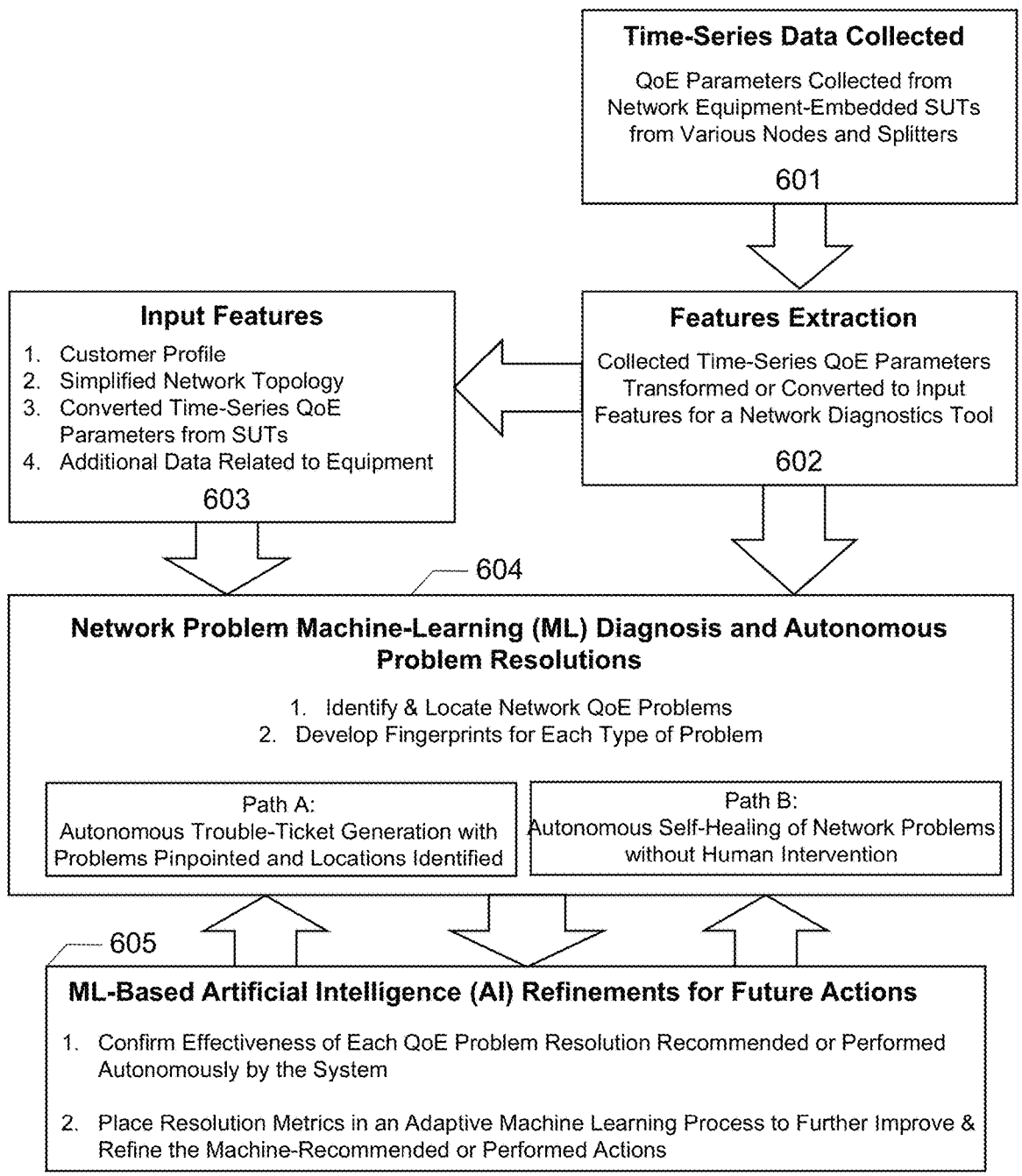
FIG. 6 shows an autonomous diagnostic process flow with an artificial intelligence (AI) refinement feedback loop in the machine learning-based network analytics, troubleshoot, and self-healing system, in accordance with an embodiment of the invention.

FIG. 6 shows an autonomous diagnostic process flow (600) with an artificial intelligence (AI) refinement feedback loop (i.e. 604 to 605, and vice versa) in the machine learning-based network analytics, troubleshoot, and self-healing system, in accordance with an embodiment of the invention. In one implementation of the present invention, the first three processing steps (601, 602, 603) in this autonomous diagnostic process flow (600) are executed by the network diagnostic data reading sub-block of the machine learning (ML)-based artificial intelligence analytical module (i.e. 205 in FIG. 2), while the fourth processing step (604) is executed by the network diagnostic analysis tool sub-block and the QoE problem resolution sub-block in the ML-based artificial intelligence analytical module. Furthermore, the fifth processing step (605) with a loopback to the fourth processing step is executed by the network heuristic rules validation sub-block with AI refinements for future actions, as shown in FIG. 6.

The first step (601) in the autonomous diagnostic process flow (600) involves collection of time-series data and other diagnostic data as QoE parameters from network equipment-embedded SUTs from various network nodes, splitters, routers, servers, and end-user modems. Then, the collected time-series QoE parameters are transformed or converted to input features format compatible to a network diagnostics tool, as shown in the second step (602). In the preferred embodiment of the invention, the input features are synthesized into an AI analytics module input-compatible format that includes a customer profile, a simplified network topology, converted time-series QoE parameters from SUTs, and any additional diagnostics or performance data related to network equipment, as shown in the third step (603).

Then, the network diagnostic analysis tool sub-block and the QoE problem resolution sub-block in the ML-based artificial intelligence (AI) analytical module (e.g. 205 in FIG. 2) perform autonomous machine diagnosis of network QoE problem identification and formulate machine-determined problem resolutions as shown in the fourth step (604) of the autonomous diagnostic process flow (600). In the preferred embodiment of the invention, the ML-based AI analytical module is a software module executed in a cloud-computing resource (e.g. one or more cloud network-connected scalable servers). The ML-based AI analytical module is also configured to improve accuracy and effectiveness of its autonomous QoE problem detection and location identification capabilities through an artificial intelligence (AI) refinement feedback loop (i.e. 604 to 605, and vice versa) provided by the big-data machine learning over an extended operational period.

The big data dynamically updated in the ML-based network analytics, troubleshoot, and self-healing system is an accumulation of various QoE parameters originating from end-user modems, intermediary transport-level network nodes, splitters, routers, servers, and other network equipment. The ML-based AI analytical module operating from the cloud-computing resource to monitor and identify QoE problems, as shown in the fourth step (604) and the fifth step (605) of the autonomous diagnostic process flow (600), can coexist with legacy systems and conventional diagnostic tools within the data network, thus simplifying operational management of the data network by an ISP or another telecommunications service provider.

As shown in FIG. 6, the fourth step (604) of the autonomous diagnostic process flow (600) first identifies and locates network QoE problems. In particular, the ML-based AI analytical module is able to autonomously discover network QoE problems and pinpoint the source of such problems originating from an equipment failure within an intermediary transport node, a splitter, an end-user modem, a data line disconnection, a power outage in a certain region, etc. Then, the machine learning-based network analytics, troubleshoot, and self-healing system utilizes artificial intelligence to develop fingerprints for each type of problem to comprehend traits, origins, and characteristics autonomously for each problem, and then to follow one of the two pathways autonomously (i.e. without human operator interventions) to resolve QoE problems.

The first path (i.e. "Path A") involves an autonomous trouble-ticket generation with problems pinpointed and locations identified by the machine learning-based network analytics, troubleshoot, and self-healing system without human operator interventions. Once a trouble ticket is generated, a human repair technician can use the autonomous machine-identified QoE problem descriptions, problem source location information, and recommended repair actions to perform an onsite repair, a customer premise visit for an equipment replacement or repair, or another action to resolve the QoE problems as rapidly and efficiently as possible. For the machine learning-based network analytics, troubleshoot, and self-healing system, this first path (i.e. "Path A") may be an optimal solution for resolving network QoE problems that require physical repairs or replacement of parts, equipment, and/or connections, instead of software-based online repair actions.

On the other hand, as also shown in the fourth step (604) in the autonomous diagnostic process flow (600) in FIG. 6, the second path (i.e. "Path B") involves an autonomous self-healing of network QoE problems without human repair technician interventions. The autonomous self-healing approaches for QoE problem resolutions are particularly ideal if a network congestion or a disconnection can be resolved by taking a software-based online repair action to a machine-identified source of the QoE problem. Examples of such software-based online repair actions include, but are not limited to, changing a wireless LAN channel in an end-user modem, rebooting a network equipment, and/or reinstalling a piece of software in a device identified as the source of the network QoE problem.

The autonomous diagnostic process flow (600) also incorporates the fifth step (605) that confirms effectiveness of each QoE problem resolution recommended or performed autonomously by the system. A quantitative or qualitative evaluation of the effectiveness of QoE problem resolutions is then utilized as a resolution metric in an adaptive machine-learning process to further improve and refine the machine-recommended or performed actions in a feedback loop with the fourth step (605), as shown in FIG. 6. Over time, the iterative adaptive machine learning provided by this feedback loop increases the effectiveness and the accuracy of the autonomous diagnostic process by the machine learning-based network analytics, troubleshoot, and self-healing system.

Figure 7:
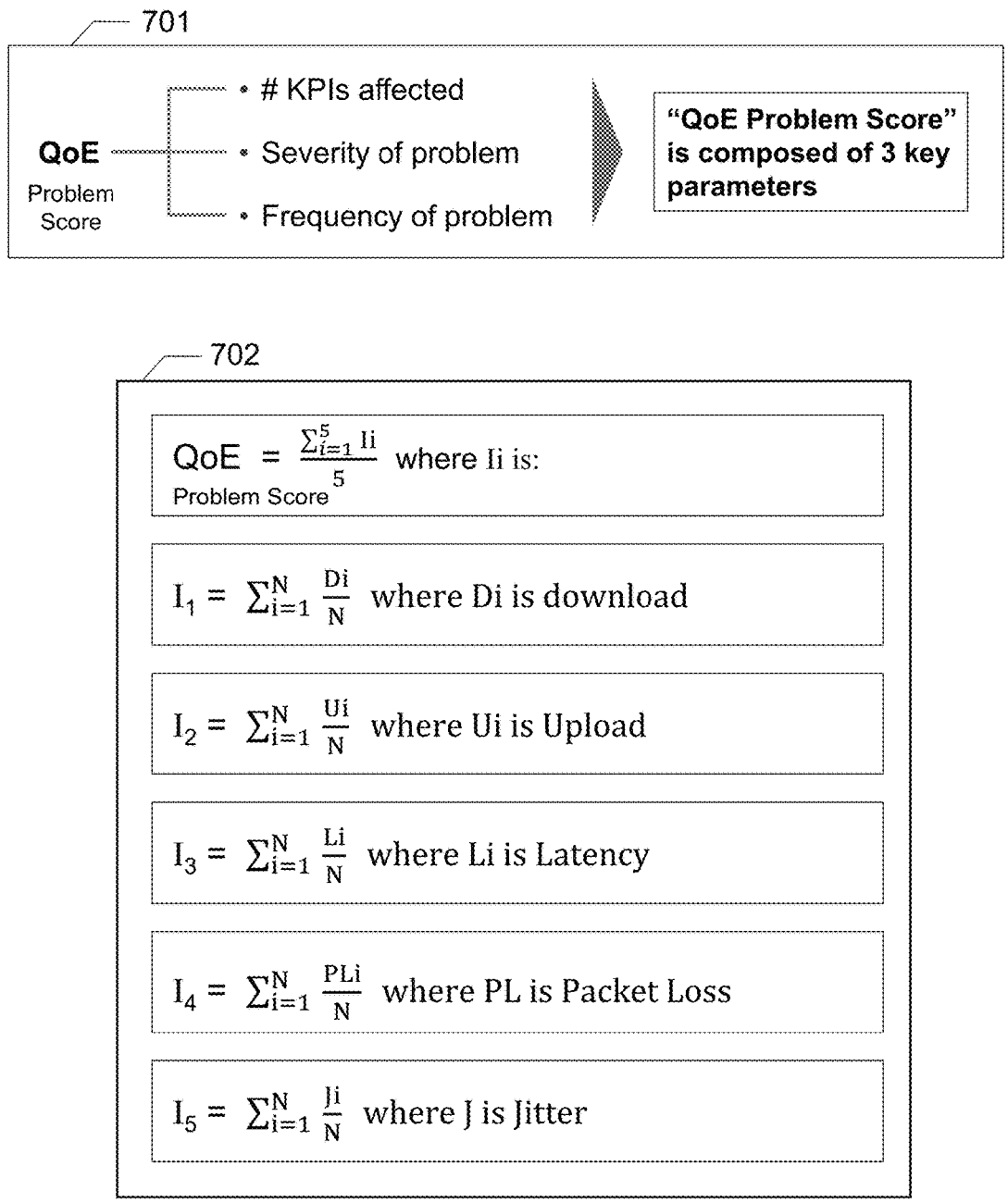
FIG. 7 shows an example of a "quality of experience" (QoE) analysis for a one-day measurement window performed by the machine learning-based network analytics, troubleshoot, and self-healing system, in accordance with an embodiment of the invention.

FIG. 7 shows an example of a "quality of experience" (QoE) analysis (700) for a one-day measurement window performed by the machine learning-based network analytics, troubleshoot, and self-healing system, in accordance with an embodiment of the invention. As shown in an upper diagram box (701) in FIG. 7, a QoE problem evaluation metric (i.e. "QoE problem score") comprises (1) number of key performance indicators (KPIs) affected by a problem, (2) severity of the problem, and (3) frequency of the problem as three key input parameters and criteria in defining what the QoE problem score means to a network health and customer satisfaction analysis. In general, higher QoE problem scores suggest more urgency and necessity to repair the problem to resolve network-related customer inconvenience and dissatisfaction. For example, more KPIs affected by a problem, higher severity of the problem, higher reoccurrence/frequency of the problem, or a combination thereof increases the QoE problem score. Likewise, less KPIs affected by the problem, lower severity of the problem, lower reoccurrence/frequency of the problem, or a combination thereof decreases the QoE problem score.

Furthermore, as shown in a lower diagram box (702) in FIG. 7, the QoE problem score for a one-day measurement window may be calculated and/or derived as an average value of the summation of multiple key performance indicators (KPIs). In this example, five KPIs (i.e. $I_1 \sim I_5$) are chosen for the QoE problem score calculation. These five KPIs are download performance problems ($I_1$), upload performance problems ($I_2$), latency problems ($I_3$), packet loss problems ($I_4$), and jitter problems ($I_5$), as shown in the lower diagram box (702) in FIG. 7.

FIG. 8 shows an example (800) of a QoE analysis for a three-day measurement window performed by the machine learning-based network analytics, troubleshoot, and self-healing system, in accordance with an embodiment of the invention. In this instance, the three-day measurement window for the QoE analysis involves deriving a QoE problem score over three days, wherein the QoE problem score is calculated as the average of the summation of daily QoE problem scores. An exemplary formula (801) in FIG. 8 demonstrates how the QoE analysis can be conducted by the machine learning-based network analytics, troubleshoot, and self-healing system over the three-day measurement window. In other embodiments of the invention, this method of QoE analysis can be applied over any period of time (e.g. a seven-day measurement window, a monthly measurement window, etc.), depending on the needs of a particular network service operator.

Figure 9:
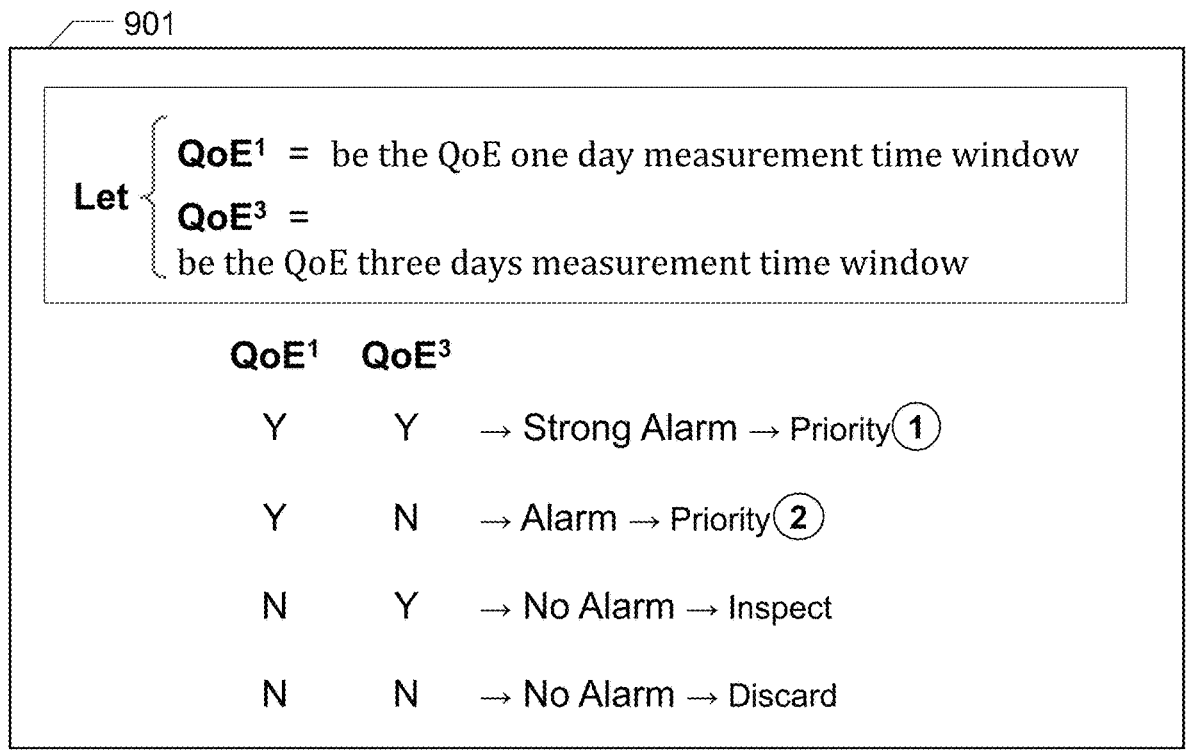
FIG. 9 shows an example of QoE improvement priority rules determined from one-day and three-day measurement window QoE alerts in the machine learning-based network analytics, troubleshoot, and self-healing system, in accordance with an embodiment of the invention.

FIG. 9 shows an example (900) of QoE improvement priority rules determined from one-day and three-day measurement window QoE problem alerts in the machine learning-based network analytics, troubleshoot, and self-healing system, in accordance with an embodiment of the invention. In a preferred embodiment of the invention, a network heuristic rules validation sub-block (e.g. 605 in FIG. 6) in the machine learning (ML)-based artificial intelligence analytical module (e.g. 205 in FIG. 2) is configured to conduct a basic "sanity check" as well as repair priority rules check against network heuristic rules pertinent to the identified network QoE problem.

For instance, the network heuristic rules validation sub-block may determine an order of network repair priority for resolving multiple network QoE problems by performing sanity checks and QoE improvement priority checks against network heuristic rules, as illustrated in a repair priority rule demonstration example (901) in FIG. 9. In this repair priority rule demonstration example (901), the highest priority for repair is assigned to a network problem that exhibited alarming QoE problem scores (e.g. above threshold value(s)) for both one-day and three-day measurement analysis, while the second highest priority for repair is assigned to another network problem that generated an alarming QoE problem score (e.g. above a threshold value) on a one-day measurement window but not on a three-day measurement window. In this repair priority rule demonstration example (901), if the three-day measurement window had an alarming QoE problem score but merely a non-alarming QoE problem score on the one-day measurement window, then a lower-priority inspection alert may be flagged for that particular network problem.

Furthermore, if both one-day and three-day measurement windows generated no alarming levels of QoE problem scores, then logically, a potential network problem previously identified by the machine for that particular case may be discarded or deleted from the system, as shown in FIG. 9. In another instance, the network heuristics rules validation sub-block may determine that the basic sanity check and/or repair priority rules check associated with the identified network QoE problem suggest that the problem is either already resolved or falsely flagged by SUTs or other components of the system.

Various embodiments of the present invention provide several key advantages in data network problem discovery and repair processing. One advantage of an embodiment of the present invention is providing a novel electronic system for identifying and locating sources or causes of data network problems autonomously within an entire end-to-end network topology of a network operator, while not necessitating human diagnosis of the data network problems.

In addition, another advantage of an embodiment of the present invention is providing a novel electronic system that autonomously heals data network-related problems within an entire end-to-end network topology of a network operator, whenever situations merit software-based automated network repairs.

Furthermore, another advantage of an embodiment of the present invention is providing a novel electronic system that autonomously generates trouble tickets for physical repairs without human diagnostic interventions, wherein each trouble ticket pinpoints problems and identifies problem locations autonomously by utilizing a machine-learning diagnostic tool that monitors an entire end-to-end network topology of a network operator, including individual end-user modems.

Yet another advantage of an embodiment of the present invention is providing a method for operating a novel electronic system for identifying, locating, and self-healing sources or causes of data network problems autonomously within an entire end-to-end network topology of a network operator, while not necessitating human diagnosis of the data network problems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A machine learning-based network analytics, troubleshoot, and self-healing system comprising:
    a modem-embedded smart universal telemetry (SUT) module executed with a modem device firmware in an end-user modem, wherein the end-user modem is a service provider's on-premise network equipment that further connects to end users' personal and mobile computing devices, and wherein the modem-embedded smart universal telemetry (SUT) module is configured to accumulate and then transmit end-user quality-of-experience (QoE) diagnostic parameters as dynamic inputs to a wireless local-area network (LAN) and broadband big data module via an operator's wide-area data network;
    a broadband measurement server connected to the end-user modem and the operator's wide-area data network, wherein the broadband measurement server actively measures network performance criteria from the modem-embedded smart universal telemetry (SUT) module to another node in the operator's wide-area data network to identify a network congestion, an outright network disconnection, or another network bottleneck issue autonomously without a human operator intervention, and wherein the broadband measurement server is further configured to transmit broadband diagnostic datasets accumulated from active measurements of the network performance criteria to the wireless LAN and broadband big data module;
    a wireless LAN measurement server connected to the end-user modem and the operator's wide-area data network, wherein the wireless LAN measurement server actively collects wireless LAN-related diagnostic datasets from one or more wireless LAN networks connected to the operator's wide-area data network, and wherein the wireless LAN measurement server is further configured to transmit the wireless LAN-related diagnostic datasets to the wireless LAN and broadband big data module;
    the wireless LAN and broadband big data module connected to the modem- embedded smart universal telemetry (SUT) module, the broadband measurement server, and the wireless LAN measurement server, wherein the wireless LAN and broadband big data module receives the broadband diagnostic datasets from the broadband measurement server, the wireless LAN-related diagnostic datasets from the wireless LAN measurement server, and the end-user QoE diagnostic parameters from the modem-embedded smart universal telemetry (SUT) module, and wherein the wireless LAN and broadband big data module is further configured to convert, categorize, and store all collected diagnostic information in a dynamic relational database in a cloud-computing resource connected to the operator's wide-area data network; and
    a machine learning (ML)-based artificial intelligence (AI) analytical module connected to the wireless LAN and broadband big data module and the operator's wide-area data network, wherein the ML-based AI analytical module operates artificial intelligence (AI) and adaptive machine learning on the broadband diagnostic datasets, the wireless LAN-related diagnostic datasets, and the end-user QoE diagnostic parameters retrieved from the dynamic relational database in the wireless LAN and broadband big data module to diagnose, determine, and resolve a network QoE problem autonomously without the human operator intervention, and wherein a resolution to the network QoE problem involves either an autonomous machine-determined trouble-ticket generation with the network QoE problem pinpointed and location identified, or an autonomous machine-initiated self-healing of the network QoE problem via a software modification to a network equipment causing the network QoE problem;
    wherein the broadband diagnostic datasets accumulated from the active measurements of the network performance criteria in the broadband measurement server include latency, jitter, download speed, upload speed, and packet loss information between the modem-embedded smart universal telemetry (SUT) module incorporated in the end-user modem and another node in the operator's wide-area data network; and
    wherein the machine learning (ML)-based artificial intelligence (AI) analytical module is further configured to calculate a QoE problem score for a particular network problem, and wherein the QoE problem score is an average of a number of key performance indicators for the particular network problem, with each key performance indicator reflecting severity and frequency of the particular network problem.

2. The machine learning-based network analytics, troubleshoot, and self-healing system of claim 1, further comprising a provisioning module connected to the modem-embedded smart universal telemetry (SUT) module and the ML-based AI analytical module, wherein the provisioning module is configured to initialize, register, and housekeep a plurality of modem-embedded smart universal telemetry (SUT) modules in a plurality of end-user modems in the operator's wide-area data network for upkeeping current device registration and diagnostic data collection frequency and type information.

3. The machine learning-based network analytics, troubleshoot, and self-healing system of claim 1, further comprising a visualization dashboard interface executed in the cloud-computing resource connected to the operator's wide-area data network to display various collected time-series diagnostic data parameters, converted input features, analytical processing indicators, and autonomous machine-determined analytical outcomes.

4. The machine learning-based network analytics, troubleshoot, and self-healing system of claim 1, wherein the machine learning (ML)-based artificial intelligence (AI) analytical module incorporates a network diagnostic data reading sub-block, a network diagnostic analysis tool sub-block, a network heuristic rules validation sub-block, and a QoE problem resolution sub-block.

5. The machine learning-based network analytics, troubleshoot, and self-healing system of claim 1, wherein the wireless LAN-related diagnostic datasets collected by the wireless LAN measurement server include quality of signal, site survey, user statistics, and device statistics information associated with the one or more wireless LAN networks connected to the operator's wide-area data network.

6. The machine learning-based network analytics, troubleshoot, and self-healing system of claim 1, wherein the end-user quality-of-experience (QoE) diagnostic parameters collected by the modem-embedded smart universal telemetry (SUT) module in the end-user modem include modem device operation information, modem device process information, modem memory content information, domain name system (DNS) information, and modem device-specific time-series parameters.

7. The machine learning-based network analytics, troubleshoot, and self-healing system of claim 1, wherein the machine learning (ML)-based artificial intelligence (AI) analytical module is further configured to identify and validate network transport- level problems autonomously by undergoing a media access control (MAC) latency filtering, an access problem route filtering, a persistent congestion identification, a congested hop identification, and a confirmation with frequent pings to a potential source of the network QoE problem.

8. The machine learning-based network analytics, troubleshoot, and self-healing system of claim 1, wherein the machine learning (ML)-based artificial intelligence (AI) analytical module is further configured to confirm effectiveness of the autonomous machine-determined trouble-ticket generation or the autonomous machine-initiated self-healing of the network QoE problem by utilizing resolution metrics in an adaptive machine learning process with a feedback loop for refining the artificial intelligence (AI) for future QoE problem discoveries and resolutions.

9. The machine learning-based network analytics, troubleshoot, and self-healing system of claim 1, wherein the QoE problem score for the particular network problem is compared against other QoE problem scores for other network problems in determining priority for network repairs.

10. The machine learning-based network analytics, troubleshoot, and self-healing system of claim 1, wherein the machine learning (ML)-based artificial intelligence (AI) analytical module is executed in the cloud-computing resource connected to the operator's wide-area data network and other components of the machine learning- based network analytics, troubleshoot, and self-healing system.

11. The machine learning-based network analytics, troubleshoot, and self-healing system of claim 1, wherein the modem-embedded smart universal telemetry (SUT) module incorporated in the end-user modem is interchangeably called as a modem-embedded collection agent.

* * * * *